(12) United States Patent
Botes

(10) Patent No.: US 7,742,830 B1
(45) Date of Patent: Jun. 22, 2010

(54) SYSTEM AND METHOD OF CONTROLLING DATA CENTER RESOURCES FOR MANAGEMENT OF GREENHOUSE GAS EMISSION

(75) Inventor: Par Botes, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 254 days.

(21) Appl. No.: 11/657,670

(22) Filed: Jan. 23, 2007

(51) Int. Cl.
 *G05B 13/02* (2006.01)
 *G06Q 40/00* (2006.01)
 *G06F 15/173* (2006.01)

(52) U.S. Cl. .................. 700/32; 705/37; 709/225

(58) Field of Classification Search .......... 700/286, 700/295; 705/37; 709/224
 See application file for complete search history.

(56) References Cited

U.S. PATENT DOCUMENTS

| | | | | |
|---|---|---|---|---|
| 6,098,893 | A * | 8/2000 | Berglund et al. .......... | 236/51 |
| 6,249,801 | B1 * | 6/2001 | Zisapel et al. ............. | 718/105 |
| 6,673,479 | B2 * | 1/2004 | McArthur et al. .......... | 429/12 |
| 6,766,223 | B1 * | 7/2004 | Motoyama ............... | 700/286 |
| 7,467,311 | B2 * | 12/2008 | Bahali et al. ............. | 713/320 |
| 7,509,506 | B2 * | 3/2009 | Bahali et al. ............. | 713/320 |
| 7,552,033 | B1 * | 6/2009 | Culp et al. ............... | 703/2 |
| 2002/0111905 | A1 * | 8/2002 | Nagafuchi et al. ......... | 705/40 |
| 2002/0194145 | A1 * | 12/2002 | Boucher et al. ........... | 705/500 |
| 2003/0009705 | A1 * | 1/2003 | Thelander et al. ......... | 713/340 |
| 2003/0055969 | A1 * | 3/2003 | Begun et al. ............. | 709/226 |
| 2003/0158940 | A1 * | 8/2003 | Leigh ..................... | 709/226 |
| 2004/0039684 | A1 * | 2/2004 | Sandor .................... | 705/37 |
| 2005/0094357 | A1 * | 5/2005 | Ewing et al. ............. | 361/626 |
| 2005/0165511 | A1 * | 7/2005 | Fairlie ................... | 700/286 |
| 2005/0246190 | A1 * | 11/2005 | Sandor et al. ............ | 705/1 |
| 2006/0129675 | A1 * | 6/2006 | Zimmer et al. ........... | 709/225 |
| 2006/0161450 | A1 * | 7/2006 | Carey et al. ............. | 705/1 |
| 2006/0208571 | A1 * | 9/2006 | Fairlie ................... | 307/11 |
| 2007/0097659 | A1 * | 5/2007 | Behrens et al. .......... | 361/788 |
| 2008/0126542 | A1 * | 5/2008 | Rhoades et al. .......... | 709/225 |

OTHER PUBLICATIONS

"Conferences: UK Group Addresses Data Center Energy Efficiency," UK Datacentre Networking Group, London, England, Sep. 22, 2006, http://www.hpcwire.com/hpc/913885.html.

K. Rajamani and C. Lefurgy. On Evaluating Request-Distribution Schemes for Saving Energy in Server Clusters. In Proceedings of the IEEE International Symposium on Performance Analysis of Systems and Software, Mar. 2003.

(Continued)

*Primary Examiner*—Ramesh B Patel
*Assistant Examiner*—Sunray R Chang
(74) *Attorney, Agent, or Firm*—Meyertons, Hood, Kivlin, Kowert & Goetzel, P.C.

(57) ABSTRACT

A data center control system includes a storage configured to maintain an emission usage value indicative of an estimated amount of greenhouse gas emission caused by consumption of power by resources within one or more data centers. The control system also includes a controller that may provide a signal to control an operation of at least one of the resources depending upon the indication of the estimated amount of greenhouse gas emission.

21 Claims, 3 Drawing Sheets

OTHER PUBLICATIONS

A. Fanara, "Dear Enterprise Server Manufacturer or Other Interested Stakeholder," U.S. Environmental Protection Agency, Washington, DC, December 28, 2006, http://www.energystar.gov/ia/products/downloads/Server_Announcement.pdf.

J. Koomey, et al, "Server Energy Measurement Protocol", Nov. 3, 2006, http://www.energystar.gov/ia/products/downloads/Finalserverenergyprotocol-v1.pdf.

"Smart Power," Hewlett-Packard Development Company, L.P., 2007, http://www.hpl.hp.com/research/dca/smartpower/.

* cited by examiner

SYSTEM AND METHOD OF CONTROLLING DATA CENTER RESOURCES FOR MANAGEMENT OF GREENHOUSE GAS EMISSION

BACKGROUND OF THE INVENTION

1. Field of the Invention

This invention relates to data center workload management and, more particularly, to the controlling of resources within data centers. The invention also relates to the regulation of greenhouse gases.

2. Description of the Related Art

For some time now, the task of addressing global warming has been gaining worldwide momentum. In an effort to curb global warming, many nations have begun instituting regulations on how much greenhouse gas an entity may emit. In some cases, these regulations stem from worldwide treaties that mandate a nation's maximum emissions. For example, an update to the United Nations Framework Convention on Climate Change (known as "the Kyoto Protocol") has set mandatory emission limits for signatory nations. As such, a governing body within such a nation may provide an allocation of emissions (or amount of allowable emissions) to a given company. In addition, in non-signatory nations, various governmental bodies have voluntarily instituted restrictions on greenhouse gas emissions.

Recently, several nations have expressed concern over the growing energy demands made by data centers. A single computing data center may include hundreds of thousands of computer servers that may be housed in thousands of server racks. According to some studies done in conjunction with the United States Environmental Protection Agency (EPA), estimates indicate that a single high-density server rack may consume as much as 20 kW. In addition to the power consumed by the computing equipment (which may account for only 19% of the data center power consumption), the data center infrastructure (e.g., cooling, back-up power supplies, etc.) may account for as much as and additional 80% of the power consumed by the data center. Thus, the power consumed by a data center is significant. As energy costs rise, regional energy demand increases, and regulation of greenhouse gas emission increases, energy consumption and resource management may become a critical factor in managing a data center.

There are many initiatives to reduce the amount of energy used in data centers. For example, the EPA is initiating an ENERGY STAR specification for enterprise computer servers. This specification may give data center managers a tool with which they may better estimate energy use of their systems. Along those lines, server equipment manufacturers have embarked on a campaign to produce "greener" machines that consume less energy. Further, recent studies are being conducted to determine the efficacy of using direct current (DC), instead of alternating current (AC) to power the data center equipment. However, even with the current and planned data center and server improvements described above, additional improvements may be desirable.

SUMMARY

Various embodiments of a system and method of controlling data center resources are disclosed. In one embodiment, a data center control system may be embodied by a computer including a controller coupled to a storage medium. The storage may be configured to maintain an emission usage value indicative of an estimated amount of greenhouse gas emission caused by consumption of power by resources within one or more data centers. The controller that may provide a signal to control an operation of at least one of the resources depending upon the indication of the emission usage value.

In one exemplary implementation, a data center control system may be configured to process a number of tasks such as data backups, running applications such as web server applications, and the like. In, an effort to manage greenhouse gas emissions that may be associated with power consumption by one or more data centers that perform the tasks, the control system may analyze the stored emission usage value in relation to various additional information to determine which processes to run, which resources to utilize, and when to run the processes.

In the above exemplary implementation, the control system may determine the emission usage value based upon the amount of power being used (e.g., over a period of time). The control system may also store an allocated emission value that may specify an allocated (or allowable) amount of greenhouse gas emission for one or more of the data centers. Depending upon the emission usage value, the control system may analyze the additional information such as, for example, the allocated emission value, emission characteristic(s) information, data center resource information, and/or service level agreement information to determine which processes to run, which resources to utilize, and when to run the processes. The emission characteristic(s) information may correspond to the energy source of a power generation facility(s) that supply power to the data center(s). The data center resource information may include computing resource performance and availability information. Data center resource information may also include information associated with the data center infrastructure systems such as cooling and lighting systems, for example. The processing tasks performed by the data center may be associated with quality of service parameters that may be specified in one or more service level agreements, as desired. These service level agreements may, in some cases, obligate the data center to run a certain process within a given time frame, or specify a given web server up-time, for example.

The data center control system may analyze some or all of the information to control the resources within the data center(s). For example, the control system may reschedule processing tasks or cause processing tasks performed on one or more computing resources to be performed on different computing resources within the data center. In addition, the control system may reduce power to one or more computing resources and/or the corresponding infrastructure systems within the data center. Further, the control system may reschedule processing tasks or cause processing tasks performed on one or more computing resources within one data center to be performed on computing resources to within a different data center.

In another embodiment, a method of operating one or more data centers includes maintaining an indication of an estimated amount of greenhouse gas emission caused by consumption of power by resources within the one or more data centers. The method also includes providing a signal to control an operation of at least one of the resources depending upon the indication of the estimated amount of greenhouse gas emission.

Figure 1:
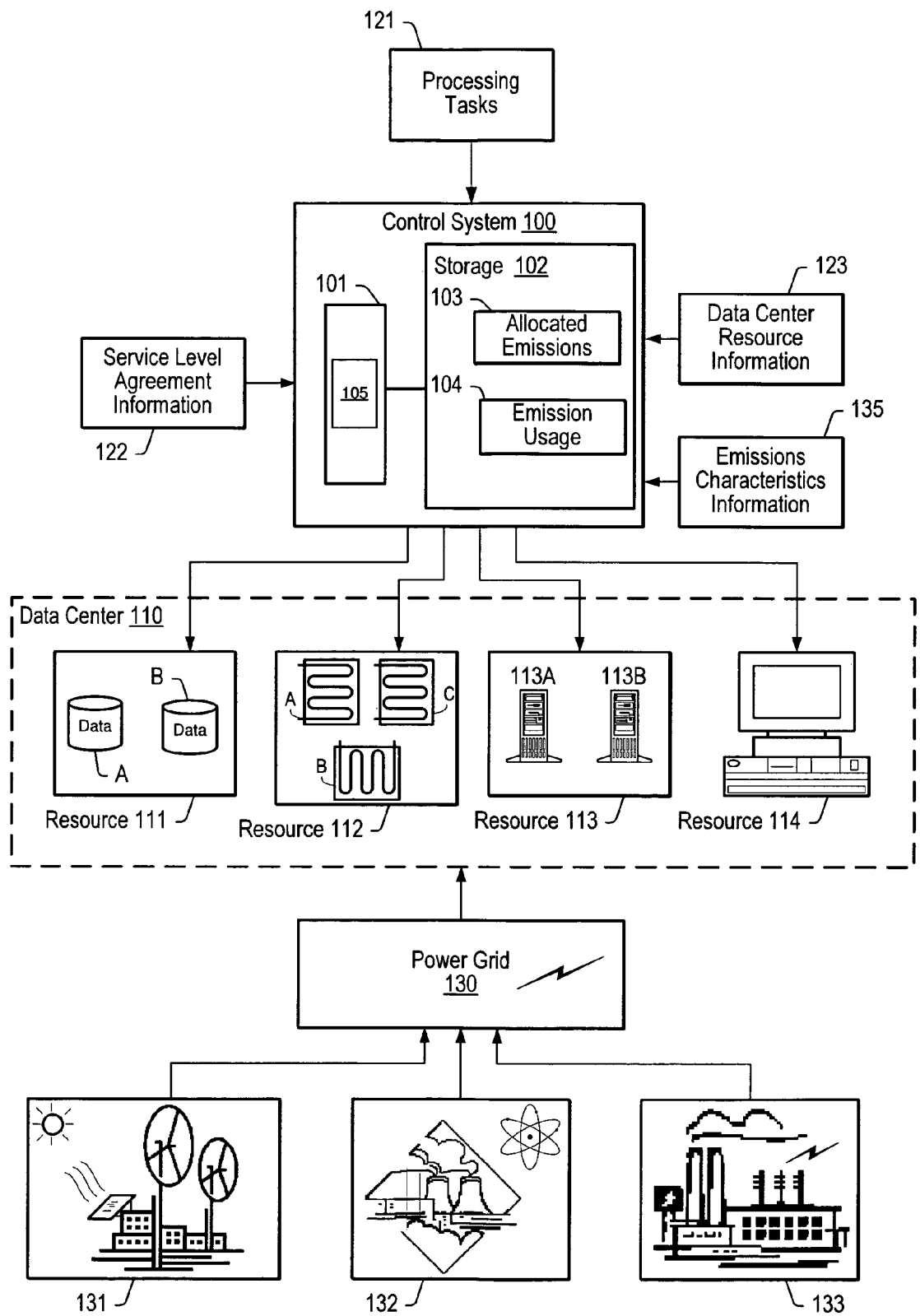
FIG. 1 is a diagram of one embodiment of a system for controlling resources in a data center.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a diagram of one embodiment of a system for controlling data center resources is shown. The system includes a control system 100 which is coupled to various resources 111-114 within data center 110. Control system 100 may receive information corresponding to processing tasks 121 that may be performed in the data center. Control system 100 may also receive additional information. For example, in the illustrated embodiment, control system 100 may receive service level agreement information 122 that may be associated with one or more of the processing tasks 121, data center resource information 123, and emission characteristics information 135 that may be associated with one or more power generation facilities 131-133 that may generate the power that supplies the data center 110.

In the illustrated embodiment, data center 110 is coupled to a power grid 130. Power grid 130 may be representative of a typical electric power grid used to distribute power to a facility such as data center 110. In various embodiments, the power grid 130 may include both private and public power resources including electric power lines, electric substations, and the like.

As shown, the power grid 130 may receive electric power from various sources. For example, power generation facility 133 represents a typical power plant that generates power using fossil fuels such as coal, natural gas, fuel oil, and so on. Power generation facility 132 is representative of a nuclear power generation plant. In addition, power generation facility 131 is representative of a renewable energy power generation facility that may use energy sources such as, for example, solar, wind, wave, and hydroelectric, etc.

Data center 110 is representative of any type of type of facility that processes or maintains data or processes information. For example, the data center may be related to any type of industry, including financial, commercial, industrial, and computer. A typical data center may provide web-hosting services, provide data storage and backup, run specific application software, and the like. To support such functionality, a typical data center may include a variety of computing resources including servers, workstations, mass storage, power supplies, uninterruptible power supplies and power conditioners, and the like. In addition, a data center may include various infrastructure systems such as, for example, cooling systems, general lighting, and so on.

Accordingly, in the particular embodiment as illustrated in FIG. 1, data center 110 is illustrated with a number of resources designated 111 through 114. Resource 111 includes mass storage equipment designated 111A and 111B. In one embodiment, each of mass storage equipment 111A and 111B may be representative of any mass storage device such as a disk drive or array of disk drives, tape drives, ram disks, or other non-volatile storage devices for storing data. Resource 112 includes cooling units 112A-112C that may include, for example, high volume air conditioning (HVAC), dehumidifiers and/or liquid cooling units, etc. Resource 113 includes server units 113A and 113B. Resource 114 is representative of a workstation. It is noted that although the various resources 114 are shown with a finite number of units or devices, it is contemplated that each of the resources may include any number of respective units or devices, as desired. In addition, numerous additional or alternative types of resources may be associated with data center 110.

As illustrated in FIG. 1, control system 100 is embodied by a computer including a controller 101 coupled to a computer readable storage medium 102. Controller 101 includes one or more processors designated 105. Processor 105 is configured to execute program instructions stored within storage 102 that perform functionality as described above. Storage 102 may be any type of storage media used for storing data. For example, storage 102 may include non-volatile media such as magnetic or optical media (e.g., hard disk, floppy disk, or CD-ROM), flash random access memory (RAM), and RAM disk. In addition, storage 102 may include various types of volatile media such as RAM (e.g. SDRAM, DDR SDRAM, RDRAM, SRAM, etc.). It is noted that although control system 100 is shown embodied by a computer coupled to a storage medium, it is contemplated that in other embodiments, control system 100 may be implemented in hardware.

As shown, storage 102 includes storage for an allocated emissions value 103, and an emission usage value 104. In one embodiment, the allocated emissions value 103 is representative of an allocated (or allowable) amount of greenhouse gas emission, and the emissions usage value 104 may be indicative of an estimated amount of greenhouse gas emission caused by consumption of power by resources within data center 110. As will be described in greater detail below, controller 101 may be configured to selectively provide a signal to control the operation of the resources 111-114 depending upon the indication of the estimated amount of greenhouse gas emission.

Control system 100 may operate to facilitate management of data center emissions in view of a variety of emission trading schemes. Generally speaking, an emission trading scheme refers to an emissions regulation system in which an emission allocation is given to a company or entity. In some schemes, the emission allocation may be in the form of emission or "carbon" credits, each of which represent some particular amount of greenhouse gas emissions. In such a scheme, if a company does not use its allocation, it may sell the unused credits to, for example, a company that has exceeded its allocation, thereby allowing a company to effectively generate more than its allocated emissions. Alternatively, these unused credits may be purchased and retired by environmental groups, which may drive up the cost of remaining credits. Thus an administrative, economy-driven scheme may be provided to regulate emissions by reducing overall pollutants. It is noted that various specific emission trading schemes have been proposed.

In addition, depending on the location (e.g., country) of a given data center, certain power generation facilities may obtain "green" certification depending on the energy source used to generate the power fed into the electric grid. For example, in the United States, power generated using renewable energy sources such as wind, solar, and hydroelectric, for example, may be certified as "green" power. In some cases, these green power producers may be allowed to sell green tags, or green certificates, each of which may represent a particular amount of green power. Similarly, in some European countries green power producers may be allowed to sell renewable obligation certificates (ROCs), which may also represent a particular amount of green power. As used herein green tags, green certificates, and ROCs may be generally referred to as green credits. It is noted that in some countries, power generated by a nuclear power plant may also be considered to be green power. For example, depending on the trading scheme a green credit may be defined to represent 1000 KW of green power, although other values are possible.

In various emission trading schemes, green credits may be used to "buy down" or offset the amount of power used in determining a company's emissions. For example, a company may acquire a given number of green credits by purchasing a corresponding amount of power from a green certified power producer. As such, the number of kilowatts (KW) of green power purchased may not be used in the calculation when determining a company's total emissions.

Figure 2:
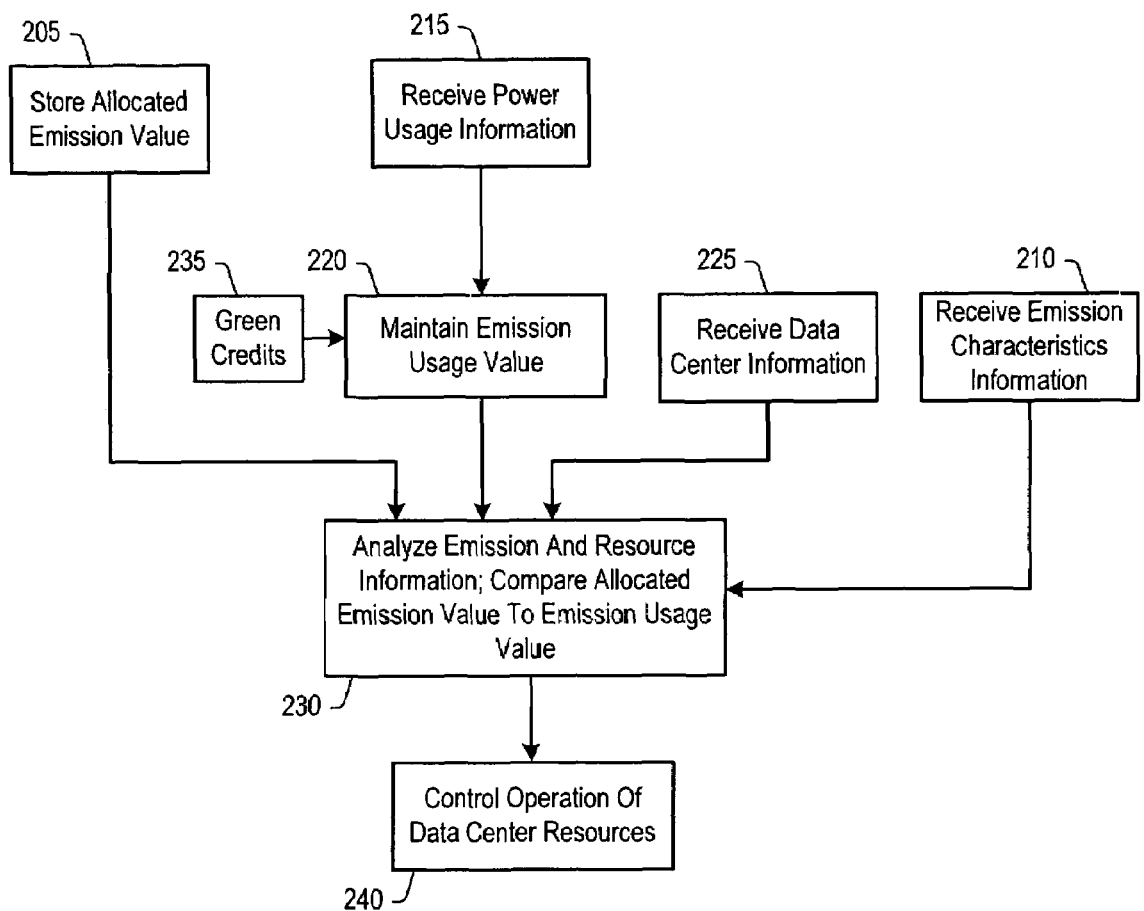
FIG. 2 is a flow diagram describing the operation of the embodiment depicted in FIG. 1.

Accordingly, FIG. 2 illustrates a flow diagram describing operation of an embodiment of the control system 100 shown in FIG. 1. Referring to FIG. 2, and beginning in block 205, controller 101 may be configured to execute program instructions to control resources within data center 110. Accordingly, controller 101 may store an allocated emission value 103 within storage 102 (block 205). As described above, the allocated emission value 103 is representative of an allocated (or allowable) amount of greenhouse gas emission assigned to a company or entity by a regulatory body. In some cases, adherence to the allocation amount may be voluntary, and in other cases adherence may be mandatory.

In addition, controller 101 may receive information associated with data center 110 (block 225). In one embodiment, the data center information may include processing tasks and task lists 121 that data center 110 may perform. For example, as described above, data center 110 may be configured to run processing tasks such as executing application software, running system data backups, performing web server functions, and so on. The data center information may also include service level agreement information 122 that may be associated with one or more of the processing asks. In addition, the data center information may include information associated with the performance and availability of the data center computing resources, as well as information associated with infrastructure systems within data center 110.

Further, in one embodiment, controller 101 may also receive information corresponding to emissions characteristics 135 associated with the one or more power sources (e.g., 131-133) used to supply power to power grid 130 and data center 110 (block 210). In one embodiment, controller 101 may also receive information corresponding to a number of green credits that have either been acquired, or may be available for acquisition, for example (block 235).

During operation, in one embodiment, controller 101 may monitor the power used by data center 110 (block 215). For example, controller 101 may receive power usage information from electrical metering and instrumentation to determine the power used.

Controller 101 may determine and store within storage 102 an emission usage value 104 for data center 110 (block 220). As described above, the emission usage value 104 may be indicative of an amount of greenhouse gas emission caused by consumption of power by resources within the data center 110. Accordingly, controller 101 may determine and store an initial emission usage value 104 using the power usage information and over some period of time, controller 101 may continue to maintain (or update) the emission usage value 104 within storage 102. In addition, as described above, controller 101 may use the number of green credits available in determining the emission usage value. For example, in one embodiment, the green credits may be used to decrease the emission usage value.

In one embodiment, controller 101 may be configured to analyze the emission usage value 104 in relation to the allocated emissions value 103 and/or any of the additional information such as the data center information and the emission characteristics information, for example, to determine whether the data center resources are being used in an optimized way when taking into consideration the emissions generated as a result of the data center's operations (block 230). More particularly, controller 101 may compare the emission usage value 104 with the allocated emission value 103 to decide whether one or more processing tasks should continue to be performed on the current resources, whether they could or should be postponed, or whether the processing tasks could or should be performed on different resources. For example, controller 101 may be configured to provide signals to control data center resources if the emission usage value 104 reaches a predetermined threshold value when compared to the allocated emission value 103. Accordingly, controller 101 may execute instructions that cause one or more signals to control resources such as the computing resources (e.g., 111A, 113A, etc.) and the infrastructure systems (e.g., 112A-112C, etc.), within data center 110 (block 240).

Specifically, in one embodiment, controller 101 may provide signals that cause one or more processes executing on one computing resource to be executed on another computing resource within data center 110. For example, in one embodiment, if one or more server systems (e.g., 113A) running a given data processing task are operating below capacity, controller 101 may be configured to provide signals to power down or reduce power to the one or more servers, relocate the processes to another server or group of servers, co-locate the processes among several local servers, or postpone performance of the task until the servers are being requested to run at a higher utilization. By reducing power, relocating processes, or co-locating processes not only can power consumption be reduced on the computing equipment, but also portions of infrastructure systems such as cooling equipment 112A-112C may be powered down or operated in a reduced capacity to further reduce power consumption.

Similarly, depending on the emission usage value 104, if a given processing task is not time critical according to, for example, the service level agreement 122, then controller 101 may schedule the non-time critical task on slower machines, which may use less power than faster machines. Alternatively, controller 101 may schedule the tasks to be run when green tags may be available for purchase or during periods when power companies offer emission credit for off-peak power consumption, for example.

It is noted that in other embodiments, control system 100 may be used to control a variety of other resources depending upon the signal. It is also noted that control system 100 may be located in one location, and data center 110 and its respective resources may be located in a different location. This scenario may thereby create a processing platform having a virtual, flexible set of resources from which a control system may choose for scheduling various processing tasks, based upon emissions.

It is also noted that the operational steps as depicted in FIG. 2 may be performed in a different order, and that certain steps may be omitted and additional steps may be performed, as desired, to achieve the desired operational functionality.

Figure 3:
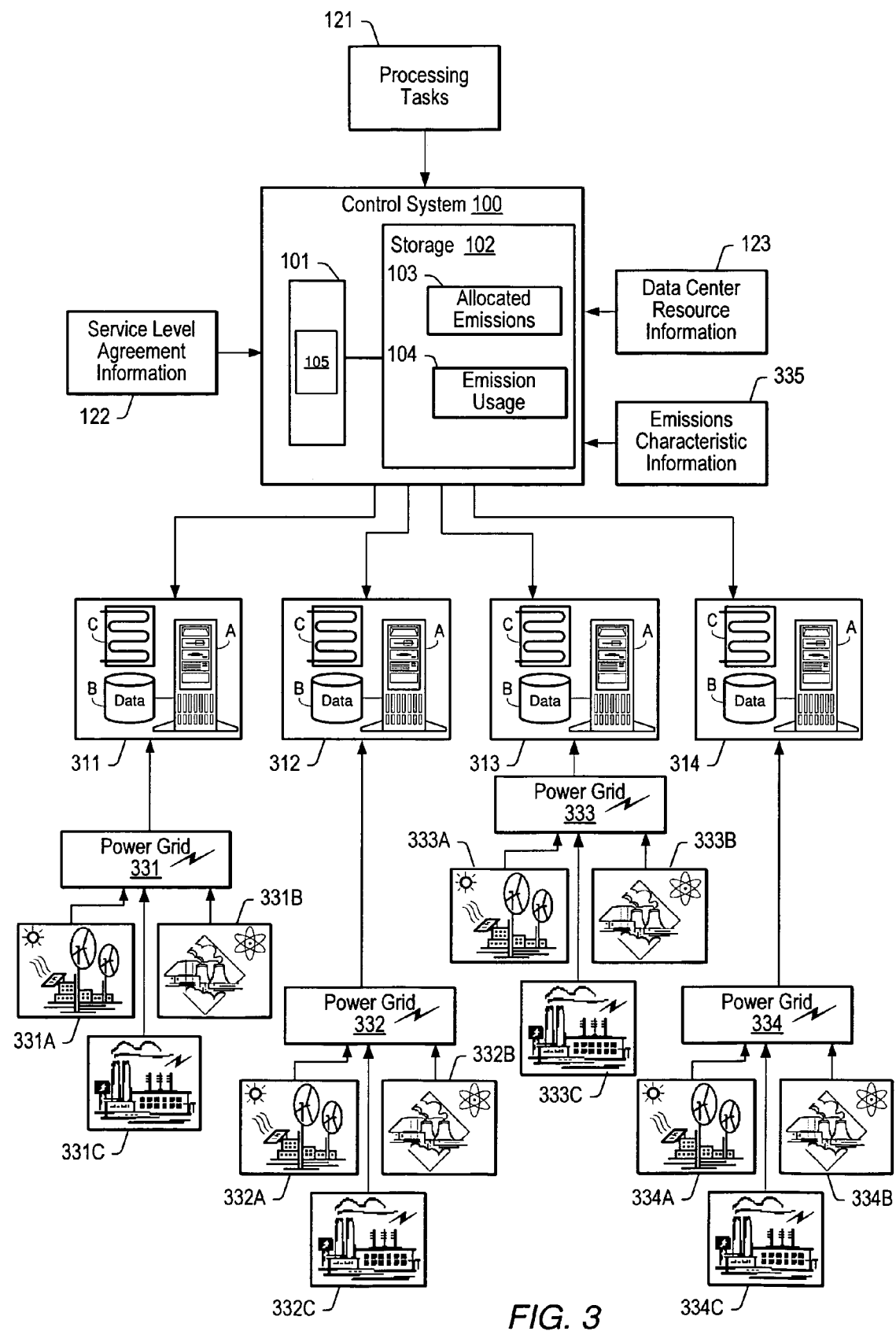
FIG. 3 is a diagram of an embodiment of a system for controlling resources in one or more data centers.

FIG. 3 is a diagram including an embodiment of a system for controlling resources in a plurality of data centers. It is noted that in one embodiment, control system 300 may be configured to perform any of various functionality of control system 100 described above. Additionally, control system 300 may provide signals to control resources within a number of data centers, whether nearby or spanning the globe. Features shown in FIG. 3 that correspond to like features shown in FIG. 1 are numbered identically for clarity and simplicity.

Referring to FIG. 3, a control system 300 may be coupled to a plurality of data centers designated, 311 though 314. Similar to data center 110 of FIG. 1, each of data centers 311-314 is coupled to a respective power grid, designated 331 through 334 and one or more corresponding power generation facilities (e.g., 331A-331C, 332A-332C, etc). In addition, similar to the embodiment shown in FIG. 1, the control system 300 of FIG. 3 may also receive data center resource information 123, information corresponding to the processing tasks 121 that may be performed in the data centers, service level agreement information 122 that may be associated with one or more of the processing tasks 121, and emission characteristics information 335 that may be associated with one or more of the power generation facilities (e.g., 331A-331C) used to generate the power that supplies the data centers.

It is noted that each of data centers 311-314 may include resources similar to the resources within the data center 110 of FIG. 1. For example, in the embodiment shown in FIG. 3, each data center may include computing resources such as servers and workstations (e.g., 311A, 312A, 313A, 314A), mass storage devices (e.g., 311B, 312B, 313B, 314B), infrastructure system components such as cooling system components (e.g., 311C, 312C, 313C, 314C), and the like.

It is noted that power generation facilities 331A-331C may be representative of any type of power generation facility including those that use renewable energy (e.g., 331A, 332A, 333A, 334A), nuclear power (e.g., 331B, 332B, 333B, 334B), fossil fuel (e.g., 331C, 332C, 333C, 334C) or any combination to generate power.

As mentioned above, it is contemplated that a given data center may be located anywhere in the world. Accordingly, each data center may be subject to a different set of emission standards, restrictions, policies, and so on. Similarly, a control system such as control system 300 may also be located anywhere in the world. Thus, control system 300 may be configured to receive and use information associated with all data centers (e.g., 311-314), and all power generation facilities (e.g., 331A-331C, etc). Accordingly, in addition to controlling task processing and scheduling within a given data center, control system 300 may control task processing and scheduling across any or all data centers 311-314 by providing control signals to control resources within one or more of the data centers 311-314 based upon emissions associated with the one or more data centers.

Thus, in one embodiment, control system 300 of FIG. 3 is embodied by a computer that includes a controller 101 and a storage 102 including storage for allocated emissions value 103, and an emission usage value 104 of each of the data centers 311-314. Controller 101 may be configured to selectively provide signals to control the operation of the resources within one or more data centers 311-314 depending upon the indication of the estimated amount of greenhouse gas emission caused by consumption of power by resources within the one or more data centers.

More particularly, controller 101 may generate control signals to control the resources within data centers 311-314. For example, in one embodiment, if data center 311 is operating below capacity, and is scheduled to run a given data processing task, controller 101 may be configured to provide signals to power down or reduce power to various resources within data center 311. In addition, control system 300 may cause the processing of task(s) scheduled to be performed at data center 311 to be performed at another data center (e.g., data center 312), or may postpone processing the task(s) until the resources within data center 311 are being requested to run at a higher utilization. By reducing power or causing processing tasks to be performed at another data center or on different resources within a given data center, not only can power consumption be reduced on the computing equipment, but also portions of infrastructure systems such as cooling equipment (e.g., 311C) may be powered down or operated at reduced capacity to further reduce power consumption.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of operating one or more computing data center facilities, the method comprising:

a controller of a computer system determining an emission usage value indicative of an estimated amount of greenhouse gas emission caused by consumption of power by one or more resources within the one or more computing data center facilities, wherein the one or more resources include computing resources and data center infrastructure resources;

wherein determining the emission usage value includes the controller automatically using a number of available green credits to reduce the estimated amount of greenhouse gas emission, wherein a green credit corresponds to a predetermined amount of power generated using a renewable energy source;

the controller comparing an allocated emission value of the one or more computing data center facilities to the emission usage value, wherein the allocated emission value corresponds to an amount of greenhouse gas emissions allocated to the one or more computing data center facilities by a governing body and is specified as a number of emission units, wherein each emission unit represents a predetermined amount of greenhouse gas emissions; and the controller providing a signal to control an operation of at least one of the one or more resources in at least one of the one or more computing data center facilities in response to the comparison between the emission usage value and the allocated emission value reaching a predetermined threshold value.

2. The method as recited in claim 1, wherein the emission usage value is dependent upon an emission characteristic of a power source used to supply power to resources within at least one of the one or more data center facilities.

3. The method as recited in claim 2, wherein the emission characteristic of the power source corresponds to a type of energy source used to generate the power.

4. The method as recited in claim 1, wherein the emission usage value corresponds to an estimated number of emission units used.

5. The method as recited in claim 1, further comprising acquiring the number of green credits to reduce the estimated amount of greenhouse gas emission.

6. The method as recited in claim 1, wherein providing a signal to control an operation of at least one of the resources comprises providing a signal to reduce power consumption of the at least one resource.

7. The method as recited in claim 1, wherein providing a signal to control an operation of at least one of the resources comprises providing a signal to cause a process executing on a first computing resource to execute on a different computing resource within a given computing data center facility, wherein the different computing resource is associated with a lower emission usage than the first computing resource.

8. The method as recited in claim 1, wherein providing a signal to control an operation of at least one of the resources comprises providing a signal to cause a process executing on a first computing resource within a first computing data center facility to execute on a different computing resource within a different computing data center facility.

9. The method as recited in claim 1, further comprising maintaining quality of service information corresponding to a service level agreement and providing the signal to control an operation of at least one of the resources depending upon the quality of service information.

10. A system for controlling a computing data center facility, the system comprising:

a controller including one or more processors configured to determine an emission usage value indicative of an estimated amount of greenhouse gas emission caused by consumption of power by one or more resources within the computing data center facility, wherein the one or more resources include computing resources and data center infrastructure resources;

wherein the controller is further configured to automatically use a number of available green credits to reduce the estimated amount of greenhouse gas emission when determining the emission usage value, wherein a green credit corresponds to a predetermined amount of power generated using a renewable energy source;

a storage coupled to the controller and configured to maintain the emission usage value;

wherein the controller is further configured to compare an allocated emission value of the computing data center facility to the emission usage value, wherein the allocated emission value corresponds to an amount of greenhouse gas emissions allocated to the one or more computing data center facilities by a governing body and is specified as a number of emission units, wherein each emission unit represents a predetermined amount of greenhouse gas emissions; and wherein the controller is further configured to provide a signal to control an operation of at least one of the one or more resources in response to the comparison between the emission usage value and the allocated emission value reaching a predetermined threshold value.

11. The system as recited in claim 10, wherein the emission usage value is dependent upon an emission characteristic of a power source used to supply power to the computing resources within center facility.

12. The system as recited in claim 11, wherein the emission characteristic of the power source corresponds to a type of energy source used to generate the power.

13. The system as recited in claim 12, wherein the emission usage value corresponds to an estimated number of emission units used.

14. The system as recited in claim 10, wherein the controller is further configured to determine whether to acquire the number of green credits to reduce the estimated amount of greenhouse gas emission.

15. The system as recited in claim 10, wherein the controller is further configured to provide a signal to reduce power consumption of the at least one resource.

16. The system as recited in claim 10, wherein the controller is further configured to provide a signal to cause a process executing on a first computing resource to execute on a different computing resource within the computing data center facility.

17. The system as recited in claim 10, wherein the controller is further configured to provide a signal to cause a process executing on a first computing resource within a first computing data center facility to execute on a different computing resource within a different computing data center facility, wherein the different computing resource is associated with a lower emission usage than the first computing resource.

18. The system as recited in claim 10, wherein the at least one resource comprises a computer processing unit.

19. The system as recited in claim 10, wherein the at least one resource comprises at least a portion of a data center cooling system.

20. The system as recited in claim 10, wherein the at least one resource comprises at least one uninterruptible power supply that supplies power to one or more of the resources within a given data center.

21. The system as recited in claim 10, wherein the controller is further configured to maintain quality of service information corresponding to a service level agreement, and to provide the signal to control an operation of at least one of the resources depending upon the quality of service information.

* * * * *